United States Patent
Kojima et al.

(10) Patent No.: US 12,319,578 B2
(45) Date of Patent: Jun. 3, 2025

(54) CATALYST STRUCTURE, FUEL REFORMING METHOD, AND FUEL REFORMING SYSTEM

(71) Applicant: N.E. CHEMCAT CORPORATION, Tokyo (JP)

(72) Inventors: Kunihiro Kojima, Aichi (JP); Kengo Furukawa, Aichi (JP); Naoto Shimane, Aichi (JP); Hiroki Nakayama, Tokyo (JP); Koichiro Honda, Tokyo (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 0 days.

(21) Appl. No.: 18/685,771

(22) PCT Filed: Jul. 29, 2022

(86) PCT No.: PCT/JP2022/029399
§ 371 (c)(1),
(2) Date: Feb. 22, 2024

(87) PCT Pub. No.: WO2023/026775
PCT Pub. Date: Mar. 2, 2023

(65) Prior Publication Data
US 2024/0367969 A1    Nov. 7, 2024

(30) Foreign Application Priority Data
Aug. 24, 2021 (JP) ................. 20211-36456

(51) Int. Cl.
*C01B 3/40* (2006.01)
*B01J 23/10* (2006.01)
(Continued)

(52) U.S. Cl.
CPC ................. *C01B 3/40* (2013.01); *B01J 23/10* (2013.01); *B01J 23/83* (2013.01); *B01J 23/894* (2013.01); *B01J 35/57* (2024.01); *B01J 37/0036* (2013.01); *B01J 37/0205* (2013.01); *B01J 37/0213* (2013.01); *B01J 37/0236* (2013.01);
(Continued)

(58) Field of Classification Search
CPC ... C01B 3/40; C01B 32/40; C01B 2203/0233; C01B 2203/1023; C01B 2203/1058; C01B 2203/1064; C01B 2203/1082; C01B 2203/1235; B01J 23/10; B01J 23/83; B01J 23/894; B01J 35/57; B01J 37/0036;
(Continued)

(56) References Cited

FOREIGN PATENT DOCUMENTS

| DE | 112017006444 T5 | * | 9/2019 | ............ B01J 23/464 |
| JP | 2008055252 A | | 3/2008 | |

(Continued)

*Primary Examiner* — Mahmoud Gimie
(74) *Attorney, Agent, or Firm* — McBee Moore & Vanik IP, LLC (57) ABSTRACT

Provided is a fuel-reforming catalyst that has excellent reforming activity and durability against deterioration factors such as catalyst poisoning and minimizes the amount of rhodium used. A fuel-reforming catalyst for reforming exhaust gas and a fuel containing a hydrocarbon into a syngas containing hydrogen, including a catalyst component and a carrier supporting the catalyst component, in which the catalyst component includes nickel, and the carrier contains a metal oxide including zirconium or cerium is provided.

7 Claims, 1 Drawing Sheet

(51) Int. Cl.
  *B01J 23/83*    (2006.01)
  *B01J 23/89*    (2006.01)
  *B01J 35/57*    (2024.01)
  *B01J 37/00*    (2006.01)
  *B01J 37/02*    (2006.01)
  *C01B 32/40*    (2017.01)
  *F02M 27/02*    (2006.01)

(52) U.S. Cl.
  CPC ............. *C01B 32/40* (2017.08); *F02M 27/02* (2013.01); *C01B 2203/0233* (2013.01); *C01B 2203/1023* (2013.01); *C01B 2203/1058* (2013.01); *C01B 2203/1064* (2013.01); *C01B 2203/1082* (2013.01); *C01B 2203/1235* (2013.01)

(58) Field of Classification Search
  CPC ................ B01J 37/0205; B01J 37/0213; B01J 37/0236; F02M 27/02
  USPC .................................................... 123/568.15
  See application file for complete search history.

(56) References Cited

FOREIGN PATENT DOCUMENTS

| | | |
|---|---|---|
| JP | 2009196837 A | 9/2009 |
| JP | 2010184836 A | 8/2010 |
| JP | 2017176991 A | 10/2017 |
| JP | 2018143988 A | 9/2018 |
| JP | 2021017380 A | 2/2021 |
| WO | 2012096017 A1 | 7/2012 |
| WO | WO-2019021244 A1 * | 1/2019 ......... B01D 53/9418 |

* cited by examiner

CATALYST STRUCTURE, FUEL REFORMING METHOD, AND FUEL REFORMING SYSTEM

CROSS-REFERENCE TO RELATED APPLICATIONS

This application is the National Stage entry of International Application No. PCT/JP2022/029399, filed 29 Jul. 2022, which claims priority to Japan No. 2021-136456, filed 24 Aug. 2021, the disclosure of each of which are incorporated herein in its entirety.

BACKGROUND

Field

The present disclosure relates to a catalyst structure. More specifically, the present disclosure relates to a fuel-reforming catalyst structure for internal combustion engines for hydrocarbon for reforming a fuel containing a hydrocarbon with water vapor to produce a syngas containing hydrogen, a fuel-reforming method, and a fuel-reforming system.

Description of Related Art

In internal combustion engines, an exhaust gas recirculation (EGR) system is known in which a portion of exhaust gas after combustion is taken in and re-inhaled so as to reduce nitrogen oxides and improve fuel efficiency. In recent years, fuel-reforming engine systems, including an EGR system combined with a heat exchange type fuel reformer and a fuel supply means (fuel injection valve), in which a portion of the fuel is passed through the fuel reformer and then combusted in the cylinder, have been proposed. Fuel-reforming engine systems are advantageous in that thermal efficiency is significantly improved over conventional EGR systems. This improves thermal efficiency by using $H_2O$ (water vapor) contained in the exhaust gas from the internal combustion engine and the heat of the exhaust gas to generate hydrogen and carbon monoxide from part of the fuel through a water vapor-reforming reaction and supplying them with the fuel to the internal combustion engine. The heat of the exhaust gas is used for the endothermic reaction of the water vapor-reforming reaction.

For example, Patent Literature 1 discloses, as a catalyst used in fuel-reforming engine systems that use fuel as a means of hydrogen enrichment, a fuel-reforming catalyst comprising: at least one metal catalyst component selected from rhodium (Rh), platinum (Pt), palladium (Pd), nickel (Ni), and cobalt (Co); and at least one oxide selected from ceria, zirconia, alumina, and titania or a composite oxide with a basic composition comprising them.

In addition, Patent Literature 2 discloses a fuel-reforming catalyst comprising: at least one metal oxide selected from zirconium oxide, lanthanum oxide, cerium oxide, aluminum oxide, and magnesium oxide; at least one metal component selected from Pt, Rh, Pd, and Ni; and silicon oxide.

Further, Patent Literature 3 suggests a water vapor-reforming catalyst in which Rh, an active metal species, is supported by a ceria-zirconia-alumina composite oxide carrier, and discloses that water-vapor reforming of E20 gasoline was carried out.

In general, in the case of carrying out a water vapor-reforming reaction of fuel under conditions including automobile exhaust gas, since exhaust gas contains poisonous components such as carbon, NOx, and sulfur caused by hydrocarbons, catalysts are required to have practicality such that their performance does not deteriorate over a long period of from 10 to 15 years in the presence of these poisonous substances. Therefore, catalysts in which rhodium is supported by ceria- or alumina-based particles are suitably used for internal combustion engine applications, as described in Patent Literature 1 to 3.

CITATION LIST

Patent Literature

Patent Literature 1: JP 2009-196837 A
Patent Literature 2: JP 2008-055252 A
Patent Literature 3: JP 2018-143988 A

SUMMARY

While rhodium is a precious metal element useful as a catalytically active component, it is rare and expensive, and attempts have been made to reduce its usage. In particular, as of April 2021, the price of rhodium soared to approximately 100,000 yen/g, which is nearly five times the price in April 2020. This means that assuming the reforming catalyst of Patent Literature 3 (rhodium content: 4.8 g/L), the price of rhodium alone would be approximately 480,000 yen; thus, it is getting difficult to use catalysts containing rhodium for internal combustion engine applications such as automobiles in practice.

The present disclosure has been made based on the above-described problems. An object of the present disclosure is to provide a fuel-reforming catalyst that has excellent reforming activity and durability against deterioration factors such as catalyst poisoning and minimizes the amount of rhodium used.

Another object of the present disclosure is to provide a fuel-reforming catalyst structure, a fuel-reforming method, and a fuel-reforming engine system using the fuel-reforming catalyst.

As a result of intensive studies to achieve the above-described objects, the present inventors found that the above-described problems can be solved by obtaining a catalyst using nickel as a main catalytically active component and supporting nickel on a specific metal oxide. The present inventors also found that the catalytically active component mainly contains nickel and further contains a trace amount of rhodium such that even a catalyst containing a significantly reduced amount of rhodium can have performance comparable to conventional catalysts containing rhodium as a main catalytically active component. The present disclosure is based on these findings. In other words, the gist of the present disclosure is as follows.

[1] A fuel-reforming catalyst for reforming exhaust gas and a fuel containing a hydrocarbon into a syngas containing hydrogen, comprising
a catalyst component and a carrier supporting the catalyst component, wherein
the catalyst component comprises nickel, and
the carrier contains a metal oxide comprising zirconium or cerium.
[2] The fuel-reforming catalyst according to [1], wherein the metal oxide is cerium oxide.
[3] The fuel-reforming catalyst according to [1] or [2], wherein the catalyst component further comprises rhodium.
[4] The fuel-reforming catalyst according to [3], wherein nickel and rhodium are co-supported by the carrier.

[5] The fuel-reforming catalyst according to [3] or [4], which has a rhodium content of 1.2 g/L or less and a nickel content of 2.0 g/L or more.

[6] The fuel-reforming catalyst according to any one of [1] to [5], wherein the catalyst component further comprises at least one selected from the group consisting of platinum, iron, copper, and ruthenium.

[7] A fuel-reforming method using the fuel-reforming catalyst according to any one of [1] to [6], comprising generating hydrogen and carbon monoxide by bringing a fuel containing a hydrocarbon into contact with the fuel-reforming catalyst in the presence of water vapor contained in exhaust gas.

[8] A fuel-reforming engine system comprising:
reforming all or part of a fuel containing a hydrocarbon into hydrogen and carbon monoxide using post-combustion exhaust gas from an internal combustion engine and the fuel-reforming catalyst according to any one of [1] to [6]; and
adding the obtained hydrogen and carbon monoxide to a fuel which is supplied to the internal combustion engine.

[9] The fuel-reforming engine system according to [8], wherein the fuel-reforming catalyst is held on a substrate having a honeycomb shape.

According to the present disclosure, a catalyst uses nickel as a main catalytically active component, which is supported by a specific metal oxide. Thus, even with a catalyst in which the amount of rhodium is significantly reduced, it is possible to realize a fuel-reforming catalyst that has performance close to that of a conventional catalyst containing rhodium as a main catalytically active component.

DETAILED DESCRIPTION OF A PREFERRED EMBODIMENT

<Fuel-Reforming Catalyst>

The fuel-reforming catalyst according to one embodiment of the present disclosure is a fuel-reforming catalyst for reforming exhaust gas and a fuel containing a hydrocarbon into a syngas containing hydrogen, comprising a catalyst component and a carrier supporting the catalyst component, wherein the catalyst component comprises nickel, and the carrier contains a metal oxide comprising zirconium or cerium. Hereinafter, a catalyst component supported by a carrier and a promoter component used as necessary may be collectively referred to as "catalytically active species." In addition, A member that holds a fuel-reforming catalyst (i.e., a catalyst that comprises a catalyst component, a promoter component, and a carrier that supports both components) may be referred to as a "substrate."

(Catalyst Component)

The catalyst component used in the fuel-reforming catalyst according to the present disclosure includes catalytically active species mainly comprising nickel (Ni). As a catalyst component according to the present disclosure, a catalytically active species other than Ni may be included, and a platinum group metal element or a transition metal element may be included. Examples of platinum group metal elements include ruthenium (Ru), rhodium (Rh), palladium (Pd), osmium (Os), iridium (Ir), and platinum (Pt). Among these, Ru, Rh, and Pt are preferable from the viewpoint of catalytic activity and poisoning resistance in the reforming reaction. In addition, examples of transition metal elements include scandium (Sc), titanium (Ti), vanadium (V), chromium (Cr), manganese (Mn), iron (Fe), cobalt (Co), and copper (Cu). Among these, Fe and Cu are preferable from the viewpoint of catalytic activity and poisoning resistance in the reforming reaction. These elements may be used singly or in a combination of two or more.

According to the present disclosure, from the viewpoint of catalytic activity and poisoning resistance in the reforming reaction, it is particularly preferable to use Rh in combination with Ni. Further, as the catalytically active species used in combination with Ni, in addition to Rh, it is preferable to use at least one selected from Ru, Pt, Fe, and Cu.

According to the present disclosure, the Ni content is preferably 0.1 g/L or more from the viewpoint of catalytic activity and poisoning resistance in the reforming reaction. It is more preferably from 1 g/L to 50 g/L, still more preferably from 3 g/L to 20 g/L, from the viewpoint of maintaining the same performance as a catalyst mainly containing Rh as a catalyst component. Even in the case of using Rh in combination with Ni, considering the manufacturing cost of the catalyst, it is preferable that the Rh content is 1.2 g/L or less, and the Ni content is 2.0 g/L or more, and it is more preferable that the Rh content is 0.5 g/L or less, and the Ni content is 5.0 g/L or more.

When the catalyst component contains an element other than Ni and Rh, the proportion of the element is not particularly limited. However, the proportion of an element other than Ni and Rh is usually 1 part by mass or more, preferably 5 parts by mass or more, more preferably 10 parts by mass or more, still more preferably 100 parts by mass or more, with respect to 100 parts by mass of Ni. Meanwhile, the upper limit is usually 5000 parts by mass or less, preferably 3000 parts by mass or less, more preferably 2000 parts by mass or less, still more preferably 1000 parts by mass or less. When the proportion is within the above-described range, the performance as a fuel-reforming catalyst is improved, and deactivation due to poisoning substances such as sulfur can be suppressed.

(Promotor Component)

The fuel-reforming catalyst according to the present disclosure may comprise, as catalytically active species, a promotor component, in addition to the above-described catalyst component. Examples of a promotor component include: rare earth elements such as neodymium (Nd), scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (tm), ytterbium (Yb), and lutetium (Lu); and alkaline earth metals such as barium (Ba) and strontium (Sr). Among these, Nd, Sc, Y, La, Ce, Pr, Nd, Pm, Ba, Ni, and Sr are preferable, and Nd is more preferable from the viewpoint of the ability to generate hydrogen generated by the water vapor-reforming reaction and the resistance to deactivation due to the sulfur content contained in fuel. It is thought that using a promotor component comprising Nd as a rare earth element in combination with a catalyst component causes the promotor component to electronically interact with the catalyst component such that Nd makes it easier for Ni and Rh to assume a reduced state, resulting in the improvement of catalytic activity compared to the case of using a catalyst component alone.

The proportions of the catalyst component and the promotor component are not particularly limited. However, the proportion of the promotor component is usually 10 parts by mass or more, preferably 50 parts by mass or more, still more preferably 100 parts by mass or more, with respect to 100 parts by mass of the catalyst component. Meanwhile, the upper limit is usually 2000 parts by mass or less, preferably 1000 parts by mass or less. When both proportions are within the above-described range, the catalytic activity (fuel-reforming ability) of the catalyst component is improved, and deactivation due to poisoning substances such as sulfur can be suppressed.

Note that when a plurality of elements are included as catalyst components and promotor components, the blending proportion means the sum of the elements.

The supported amount of the above-described catalytically active species (catalyst and promotor components) is not particularly limited and may be supported in the necessary amount as appropriate depending on the intended design conditions, cost requirements, and the like. However, it is preferably from 0.05 parts by mass to 30 parts by mass, more preferably from 0.1 parts by mass to 15 parts by mass, with respect to 100 parts by mass of the carrier in terms of metal. When the supported amount of the catalytically active species is small, sufficient catalytic activity tends not to be obtained in the water vapor-reforming reaction of a fuel consisting of a hydrocarbon. Meanwhile, when the supported amount is excessively large, the metal element becomes coarse particles and the catalytic activity per unit amount of catalytically active species tends not to improve. Considering both catalyst performance and cost, the supported amount of the catalytically active species is more preferably from 0.4 parts by mass to 8 parts by mass with respect to 100 parts by mass of the carrier.

It is preferable that the catalytically active species (catalyst and promoter components) supported by the carrier are supported in a particulate form. In this case, the particle size of the catalytically active species is preferably from 1 nm to 100 nm, more preferably from 2 nm to 50 nm, from the viewpoint of catalytic activity. When the particle size of the catalytically active species is excessively small, the particles tend to become an oxide state that does not exhibit catalytic activity. On the other hand, when the particle size is excessively large, the amount of active sites decreases, and the catalytic activity per unit amount of catalytically active species tends to decrease.

To make the catalytically active species have a predetermined particle size as described above, for example, a method for supporting a catalyst by a carrier, comprising immersing a carrier in a solution containing a supply source of a catalyst component (a nitrate or acetate of an element as described above as an example) and a supply source of a promoter component (a nitrate or acetate of an element as described above as an example) to impregnate the carrier with a predetermined amount of the solution, followed by firing, is used for controlling the concentration of the solution (concentration of catalytically active species), the amount of impregnation of the solution, and the firing conditions (temperature and time), thereby making it possible to adjust the particle size of catalyst particles.

The above-described catalytically active species is supported by a carrier in the fuel-reforming catalyst according to the present disclosure. In addition, the fuel-reforming catalyst may contain components other than the catalytically active species. Note that the proportion of the above-described catalytically active species in the fuel-reforming catalyst when excluding the carrier is preferably 70% by mass or more, more preferably 90% by mass or more, particularly preferably 95% by mass or more (including 100% by mass).

(Carrier)

A metal oxide containing zirconium or cerium is used as the carrier for supporting the above-described catalytically active species. The catalyst of the present disclosure contains nickel as a main catalyst component as described above. Since the above-described metal oxide is used as a carrier for supporting a catalyst component, even with a catalyst in which the amount of rhodium is significantly reduced, it is possible to realize a fuel-reforming catalyst that has performance close to that of a conventional catalyst containing rhodium as a main catalytically active component. Although the reason for this is not specific, it can be inferred as follows.

Active sites of transition metals such as nickel are readily oxidized in the presence of oxygen and become a state such as NiO, which has low reforming activity. It can be presumed that when a trace amount of Rh exists, Ni tends to take a metal state due to oxygen consumption (CO oxidation) and $H_2$ generation by Rh.

As the carrier, known carriers other than zirconium oxide ($ZrO_2$) and cerium oxide ($CeO_2$) may be included. For example, alumina ($Al_2O_3$), titania ($TiO_2$), silica ($SiO_2$), or a composite oxide thereof, such as α, γ, δ, or θ, may be included.

In a case in which the catalyst component contains other elements in addition to Ni, each catalyst component may be supported by separate carriers or the same carrier; however, when Ni and Rh are used together, it is preferable that they are co-supported by the same carrier.

Although the shape of the carrier is not particularly limited, a particle shape is preferable. The average particle size (D50) of carrier particles can be appropriately set depending on the desired performance and is not particularly limited. However, it is preferably from 0.5 μm to 30 μm, more preferably from 1 μm to 20 μm, still more preferably 3 μm to 15 μm from the viewpoint of maintaining a large specific surface area, increasing heat resistance, and increasing the number of catalytically active sites of the carrier, and the like. Note that the average particle size D50 described herein means the median diameter measured using a laser diffraction particle size distribution analyzer.

The carrier used in the fuel-reforming catalyst of the present disclosure is preferably a porous body. Examples of a porous body include those having BET specific surface areas of from 30 $m^2/g$ to 600 $m^2/g$. To form a porous body, the carrier is prepared by a conventionally known method as described later. For example, a slurry is prepared by kneading a catalytically active species component, a carrier component, a binder, a pore-forming agent, a solvent, and the like using a ball mill or the like. The slurry is formed into a desired shape and then dried and fired; thus, the pore-forming agent and binder are removed, and pores are formed in the carrier.

<Method for Producing Fuel-Reforming Catalyst>

The fuel-reforming catalyst described above can be obtained by supporting catalytically active species components (catalyst and promoter components) on a carrier. The supporting method is not particularly limited, and conventionally known methods can be applied. For example, a carrier is impregnated with a mixed catalyst solution containing a supply source of a catalyst component (as an example, an elemental nitrate or acetate) and optionally a supply source of a promoter component (as an example, an elemental nitrate or acetate), followed by reduction or firing.

Thus, the catalytically active species component can be deposited in the form of particles on the carrier. Alternatively, a supply source of a catalyst component is impregnated into a carrier, and a supply source of a promoter component is then impregnated into the carrier, followed by reduction or firing such that both may be supported by the carrier, or vice versa, a supply source of a promoter component is impregnated into a carrier, and a supply source of a catalyst component is then impregnated into the carrier, followed by reduction or firing such that both may be supported by the carrier. After that, a fuel-reforming catalyst can be produced by performing treatments such as washing, firing, and hydrogen reduction as necessary.

Examples of a supply source of a catalytically active species component include acetates, carbonates, nitrates, ammonium salts, citrates, dinitrodiammine salts, and the like of the above-described elements, and complexes thereof. Examples thereof include solutions of nickel acetates, carbonates, nitrates, ammonium salts, citrates, dinitrodiamine salts, and the like, and their complexes. Among them, nitrates are preferable. In addition, in the case of combined use of rhodium as a platinum group metal element, examples include rhodium acetates, carbonates, nitrates, ammonium salts, citrates, dinitrodiamine salts, and the like, and complexes thereof from the viewpoint of ease of being supported and high dispersibility. Among them, nitrates are preferable.

(Catalyst Structure)

In a case in which the above-described fuel-reforming catalyst is used in a fuel reformer for internal combustion engines, for example, it is preferable to use a catalyst structure in which the fuel-reforming catalyst is supported by a substrate. The substrate is not particularly limited as long as it consists of a material that can support the catalyst layer described later and has a certain degree of fire resistance, and any conventionally known substrate can be used. Examples of a material for the substrate include: ceramics such as alumina, silica, mullite (alumina-silica), cordierite, cordierite-alpha alumina, zircon mullite, alumina-silica magnesia, zircon silicate, sillimanite, magnesium silicate, zircon, petalite, aluminosilicates, aluminum titanate, silicon carbide, and silicon nitride; and metallic materials, including refractory metals such as corrosion-resistant alloys such as stainless steel or iron-based ferritic stainless steel. The above-described inorganic or metallic materials may be used singly or in a combination of two or more. Among the above, alumina, silica, mullite, cordierite, stainless steel, and silicon carbide are preferable, and those containing cordierite, stainless steel, and silicon carbide are more preferable. In such cases, a substrate consisting of the above-described material that accounts for preferably 80% by mass or more, more preferably 90% by mass or more, particularly preferably 99% by mass or more (including 100% by mass) of the entire substrate may be used.

In addition, the substrate may contain the above-described materials as main components and other components. For example, $Fe_2O_3$, $SiO_2$, $Na_2O$, and the like, which are known to improve the heat resistance of the carrier, may be added to the above-described materials.

The shape of the substrate is also not particularly limited. The substrate can be in various shapes depending on the purpose, such as spherical, cylindrical, bead-like, pellet-like, rectangular column-like, tablet-like, needle-like, membrane-like, honeycomb monolith-like, or the like. Among these, bead-like, pellet-like, and honeycomb monolith-like substrates are preferable. Therefore, it is preferable that the substrate according to a preferred embodiment of the present disclosure consists of alumina, silica, mullite, cordierite, or stainless steel as a material in a bead-like, pellet-like, or honeycomb monolith-like shape, and more preferable that the substrate is a cordierite honeycomb monolith.

In a case in which the substrate shape is bead-like or pellet-like, the average size of the substrate is preferably from 0.5 mm to 10 mm, more preferably from 0.7 mm to 5 mm, still more preferably from 1 mm to 3 mm from the viewpoint of handling and fluidity in a container. Further in a case in which the carrier shape is spherical, the average size (diameter) of the carrier is preferably from 1 mm to 10 mm, more preferably from 1 mm to 5 mm from the viewpoint of handling and fluidity in a container. The average size of the carrier can be determined by measuring the major axes and minor axes of 100 arbitrarily selected carriers (catalyst particles) by observation using an optical microscope or the like, calculating the average of the major and minor axes as the particle size, and calculating the average of the particle sizes of 100 individual particles.

Figure 1:
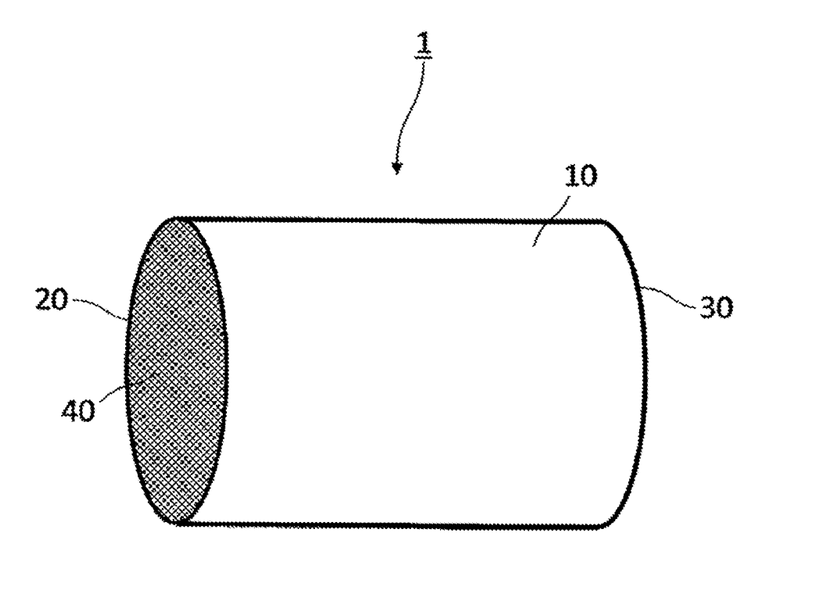
FIG. 1 is a schematic perspective view showing one embodiment of a substrate.

An embodiment of the substrate having a honeycomb monolith-like shape will be described with reference to the drawings. A substrate 1 has a cylindrical shape with a cylindrical outer circumferential surface 10, an inlet end 20, and an outlet end 30. The substrate 1 comprises a plurality of fine parallel gas flow passages 40 formed in the substrate 1. Each flow passage 40 is partitioned by a wall portion, extends through the substrate 1 from the inlet end 20 to the outlet end 30, and is formed to allow flow of the exhaust gas stream. In the partitioning wall portion, the flow passage 40 for exhaust gas may have a substantially regular polygonal shape, for example, a square shape.

The substrate 1 has a predetermined length along the exhaust gas flow direction. The length of the substrate is approximately from 25.4 mm to 400 mm, depending on the outer diameter. In addition, the outer diameter of the substrate is approximately from 76.5 mm to 400 mm. The size of one flow passage 40 partitioned by the wall portion is approximately from 1.0 mm to 2.15 mm on one side when the flow passage 40 has a square cross section.

In one example, a honeycomb catalyst holding a fuel-reforming catalyst can be obtained as a catalyst structure by preparing a slurry solution by mixing a metal salt as a catalyst component, a metal salt as a promoter component, a carrier, and optionally a binder, a dispersant, and a solvent, impregnating a substrate with the slurry solution by a wash coating method or the like, and firing the substrate impregnated with the slurry.

The solvent for the slurry solution described above is not particularly limited, and examples include solvents such as water (preferably pure water such as ion-exchanged water and distilled water).

The temperature at which the substrate impregnated with the slurry solution is fired is not particularly limited but is usually from 200° C. to 800° C. When the firing temperature is excessively low, the supply source of the catalytically active species element is not thermally decomposed sufficiently, making it difficult to realize a metal state exhibiting catalytic activity. Thus, the activity tends to decrease. On the other hand, when the firing temperature is excessively high, the supported catalytically active species element becomes coarse particles, which tends to reduce the catalytic activity in the water vapor-reforming reaction of fuel consisting of a hydrocarbon.

In addition, the firing time can be adjusted as appropriate; however, it is usually preferably from 0.1 hours to 100 hours. When the firing time is excessively short, the supply source of the catalytically active species element is not thermally decomposed sufficiently, making it difficult to realize a metal state exhibiting catalytic activity. Thus, the activity tends to decrease. On the other hand, even when the firing time is made longer than necessary, no effect will be obtained, and the cost and production volume per unit time will tend to decrease.

The amount of supported catalytically active species can be measured by an ICP emission spectrometer. By appropriately adjusting the concentration and amount of each supply source to be impregnated into the carrier, the promoter component can be supported in an amount of 50 parts by mass or more and 1000 parts by mass or less with respect to 100 parts by mass of the catalyst component.

<Applications of Fuel-Reforming Catalyst>

The fuel-reforming catalyst according to the present disclosure can be used not only for EGR applications for internal combustion engines but also as a single catalyst as it is and can be used as a catalyst in various apparatuses related to water vapor-reforming reactions. For example, it can be applied to hydrogen plants such as refineries, hydrogen production apparatuses for fuel cells in stationary distributed power sources, hydrogen production apparatuses from natural gas, and the like.

<Fuel-Reforming Method>

Using the fuel-reforming catalyst according to the present disclosure, water vapor reforming of hydrocarbons can be carried out. In other words, it is possible to generate hydrogen and carbon monoxide by bringing a fuel containing a hydrocarbon into contact with the fuel-reforming catalyst in the presence of water vapor.

In the fuel-reforming method of the present disclosure, the fuel containing a hydrocarbon and water vapor may each be supplied to a reactor independently, or they may be mixed in advance and then supplied to the reactor.

When supplying water vapor to the reactor, it is preferable to use a method in which the exhaust gas after reformed hydrogen combustion is provided to the reactor since there is no need to prepare a separate water vapor supply source, and thus, the reactor is simplified.

Examples of a hydrocarbon contained in the fuel include, but are not particularly limited to, hydrocarbons such as alkanes, alkenes, alkynes, aromatic compounds, alcohols, and aldehydes. Specifically, gaseous or liquid hydrocarbons having from 2 to 12 carbon atoms are preferable, and hydrocarbons having from 2 to 8 carbon atoms are more preferable, including linear or branched saturated aliphatic hydrocarbons such as methane, ethane, propane, butane, pentane, hexane, heptane, octane, nonane, and decane, alicyclic saturated hydrocarbons such as cyclohexane, methylcyclohexane, and cyclooctane, and monocyclic or polycyclic aromatic hydrocarbons. Among these, saturated aliphatic hydrocarbons are preferable, and it is more preferable that 50% or more of the fuel is saturated aliphatic hydrocarbons.

Further, a biomass fuel consisting of a hydrocarbon such as ethanol, gasoline, diesel fuel (light oil), natural gas, hydrocarbon gas, or biodiesel can be used as the fuel consisting of a hydrocarbon. Furthermore, when the fuel is used as a fuel consisting of a hydrocarbon in an internal combustion engine such as an automobile, for example, a mixed fuel of ethanol and gasoline can be used. Since ethanol has a high octane number, by mixing ethanol with gasoline having a low octane number (e.g., ranging from 30 to 85), it is possible to obtain, as such a mixed fuel, a mixed fuel having an octane number ranging from 80 to 100, which is equivalent to that of regular gasoline fuel. It can be suitably used as a fuel for internal combustion engines such as automobiles.

It is preferable to apply the fuel-reforming method of the present disclosure to natural gas, methanol, ethanol, and gasoline and more preferable to apply the fuel-reforming method of the present disclosure to ethanol, gasoline, and a mixed fuel of ethanol and gasoline from the viewpoint that among fuels containing hydrocarbons, they are easy to handle and safe because they are liquid at room temperature, have a high affinity with water (water vapor), and are easy to procure.

The mixing ratio of a fuel containing a hydrocarbon and water vapor contained in exhaust gas is not particularly limited. However, for example, the molar ratio of water vapor and carbon (S/C) is preferably from 0.2 to 10, more preferably from 0.4 to 5 in a case in which the fuel containing a hydrocarbon is ethanol. Using the fuel-reforming catalyst of the present disclosure, a fuel containing a hydrocarbon can be reformed even under low S/C conditions where coking occurs.

Further, the temperature of the reforming reaction is preferably from 250° C. to 800° C., more preferably from 350° C. to 700° C. According to the fuel-reforming catalyst of the present disclosure, it becomes possible to reform a fuel consisting of a hydrocarbon even at low temperatures of 400° C. or lower, where it has been difficult to carry out water vapor reforming of fuels containing hydrocarbons due to low catalytic activity. It also becomes possible to maintain high activity even at high temperatures of 550° C. or higher, making it possible to reform a fuel consisting of a hydrocarbon with water vapor.

In addition, by supplying, as a heat source, exhaust gas after combustion in an internal combustion engine to a reactor, there is no need to prepare a separate heat source, which is advantageous in terms of structure and cost.

Since the fuel-reforming catalyst according to the present disclosure has excellent resistance to sulfur poisoning, it can exhibit stable catalytic performance over a long period of time even when the fuel contains a sulfur component. Examples of a sulfur component contained in the fuel include S, $S^{2-}$, SO, $SO_2$, $SO_3$, $SO_4^{2-}$, and compounds containing S. The main origins of sulfur components include sulfur components contained in fuel upon contact and sulfur components contained in exhaust gas after fuel combustion.

<Fuel-Reforming Engine System>

EGR systems that include gasoline as fuel and use exhaust gas from an internal combustion engine as water vapor and heat sources have a simple structure for the reformer and are advantageous in terms of cost. Meanwhile, the amount of contact between the fuel-reforming catalyst and the sulfur content also increases, making it more likely that the catalyst life will be shortened.

In contrast, the fuel-reforming method using the fuel-reforming catalyst according to the present disclosure can improve thermal efficiency by being combined with an EGR system. For example, utilizing water vapor contained in post-combustion exhaust gas from an internal combustion engine, a fuel containing a hydrocarbon is brought into contact with the fuel-reforming catalyst according to the present disclosure in the presence of water vapor such that some or all of the fuel is reformed into hydrogen and carbon monoxide. By adding the obtained hydrogen and carbon monoxide to a fuel that is supplied to the internal combustion engine, the thermal efficiency of the engine can be improved.

EXAMPLES

Hereinafter, the present disclosure will be described in more detail based on Examples and Comparative Examples.

However, the present disclosure is not limited to the following Examples unless it exceeds the gist thereof. In other words, the materials, used amounts, proportions, treatment details, treatment procedures, and the like shown in the following Examples can be changed as appropriate without departing from the spirit of the present disclosure.

Reference Example 1

A γ-alumina powder (average particle size: 28 μm; BET specific surface area: 141 m²/g) was impregnated with an aqueous neodymium nitrate solution and dried. Next, the γ-alumina powder impregnated with the aqueous neodymium nitrate solution (approximately 25 wt % in terms of $Nd_2O_3$) was impregnated with an aqueous rhodium nitrate solution (approximately 7 wt % in terms of Rh) and then fired at 600° C. for 30 minutes in an air atmosphere. Thus, a rhodium-neodymium-supporting alumina precursor was obtained.

After adding nitric acid and water to the obtained rhodium-neodymium-supporting alumina powder for adjusting the pH to from 4 to 5, the mixture was wet-pulverized in a ball mill until the particle size (D90) became 12 μm or less, thereby preparing a slurry solution of a catalyst-supporting alumina powder.

Next, a honeycomb substrate made of silicon carbide (number of cells/mil thickness: 600 cpsi/4 mil) was prepared, and one end of the honeycomb substrate was immersed in the slurry solution. Vacuum suction was applied to the opposite end of the honeycomb substrate such that the surface of the substrate was impregnated with the slurry solution (wash coat amount: 150 g/L).

The honeycomb substrate impregnated with the slurry solution as above was dried at 150° C. and fired at 450° C. in an air atmosphere, thereby obtaining a catalyst-supporting honeycomb substrate. The amount of catalyst supported by the obtained catalyst-supporting honeycomb substrate (the amount of catalyst relative to the catalyst volume) was 7.9 g/L for Rh and 6 g/L for Nd.

Example 1

A cerium oxide powder (D90: 14.1 μm; average particle size D50: 9.6 μm; BET specific surface area: 160 m²/g) was impregnated with a nickel nitrate aqueous solution, dried, and then fired at 600° C. for 30 minutes in an air atmosphere, thereby obtaining a nickel-supporting cerium oxide precursor.

After adding nitric acid and water to the obtained nickel-supporting cerium oxide precursor for adjusting the pH from 4 to 5, the mixture was wet-pulverized in a ball mill until the particle size (D90) became 12 μm or less, thereby preparing a slurry solution of nickel-supporting cerium oxide particles.

Next, a honeycomb substrate made of silicon carbide (number of cells/mil thickness: 600 cpsi/4 mil) was prepared, and one end of the honeycomb substrate was immersed in the slurry solution. Vacuum suction was applied to the opposite end of the honeycomb substrate such that the surface of the substrate was impregnated with the slurry solution (wash coat amount: 150 g/L).

The honeycomb substrate impregnated with the slurry solution as above was dried at 150° C. and fired at 450° C. in an air atmosphere, thereby obtaining a catalyst-supporting honeycomb substrate. The amount of catalyst supported by the obtained catalyst-supporting honeycomb substrate (the amount of catalyst relative to the catalyst volume) was 7.9 g/L for Ni.

Example 2

A catalyst-supporting honeycomb substrate was obtained in the same manner as in Example 1, except that the carrier was changed to yttrium oxide-zirconia oxide. The amount of catalyst supported by the obtained catalyst-supporting honeycomb substrate (the amount of catalyst relative to the catalyst volume) was as shown in Table 1.

Examples 3 and 4

A catalyst-supporting honeycomb substrate was obtained in the same manner as in Example 1, except that a slurry mixture of a slurry solution of catalyst-supporting alumina powder prepared by the method described in Reference Example 1 with the amount supported shown in Table 1 and a slurry solution of nickel-supporting cerium oxide particles described in Example 1 mixed at a weight ratio of 100:150 was used, and the wash coat amount was 250 g/L. The amount of catalyst supported by the obtained catalyst-supporting honeycomb substrate (the amount of catalyst relative to the catalyst volume) was as shown in Table 1.

Comparative Examples 1 to 7

A catalyst-supporting honeycomb substrate was obtained in the same manner as in Example 1, except that there were changes to a nitrate metal salt and a carrier shown in Table 1. The amount of catalyst supported by the obtained catalyst-supporting honeycomb substrate (the amount of catalyst relative to the catalyst volume) was as shown in Table 1.

Reference Example 2

A catalyst-supporting honeycomb substrate was obtained in the same manner as in Reference Example 1, except that instead of the silicon carbide honeycomb substrate, a cordierite honeycomb substrate (number of cells/mil thickness: 600 cpsi/3.5 mil) was used as the substrate, and the wash coat amount was changed to 250 g/L. The amount of catalyst supported by the obtained catalyst-supporting honeycomb substrate (the amount of catalyst relative to the catalyst volume) was as shown in Table 1.

Example 5

The cerium oxide powder was impregnated with a mixed solution of a nickel nitrate aqueous solution and a rhodium nitrate aqueous solution, dried, and then fired at 600° C. for 30 minutes in an air atmosphere, thereby obtaining a nickel/rhodium-supporting cerium oxide precursor.

After adding nitric acid and water to the obtained nickel/rhodium-supporting cerium oxide precursor for adjusting the pH to from 4 to 5, the mixture was wet-pulverized in a ball mill until the particle size (D90) became 12 μm or less, thereby preparing a slurry solution of nickel/rhodium-supporting cerium oxide particles.

Next, a honeycomb substrate made of cordierite (number of cells/mil thickness: 600 cpsi/3.5 mil) was prepared, and one end of the honeycomb substrate was immersed in the slurry solution. Vacuum suction was applied to the opposite end of the honeycomb substrate such that the surface of the substrate was impregnated with the slurry solution (wash coat amount: 250 g/L).

The honeycomb substrate impregnated with the slurry solution as above was dried at 150° C. and fired at 450° C. in an air atmosphere, thereby obtaining a catalyst-supporting honeycomb substrate. The amount of catalyst supported by the obtained catalyst-supporting honeycomb substrate (the amount of catalyst relative to the catalyst volume) was as shown in Table 1.

Example 6

A catalyst-supporting honeycomb substrate was obtained in the same manner as in Example 5, except that a slurry mixture of a slurry solution of catalyst-supporting alumina powder prepared by the method described in Reference Example 2 with the amount supported shown in Table 1 and a slurry solution of nickel/rhodium-supporting cerium oxide particles described in Example 5 mixed at a weight ratio of 60:190 was used, and the wash coat amount was 250 g/L. The amount of catalyst supported by the obtained catalyst-supporting honeycomb substrate (the amount of catalyst relative to the catalyst volume) was as shown in Table 1.

(Hydrogen Reforming Evaluation)

Using each of the catalyst-supporting honeycomb substrates obtained as described above, water vapor reforming of a mixture of a gas simulating engine exhaust gas (CO: 0.22%; $C_3H_6$: 360 ppm; NO: 1350 ppm; $O_2$: 0.52%; $CO_2$: 13%; $H_2O$: 12%; $N_2$: balance) and high-octane gasoline was carried out. The test conditions at that time were S/C=1.0, an inlet gas temperature of 630° C., and SV≈30 k/h or 60 k/h, and the hydrogen generation amount and durability in the presence of poisonous substances were evaluated. The gas was switched to a raw material gas. The reforming rate of the raw material gas by the reforming catalyst was evaluated based on the hydrogen generation amount after the elapse of 5 minutes. The evaluation results were as shown in Table 1 below.

TABLE 1

| | Catalyst Composition | Carrier | Substrate | Rh (g/L) | NiO (g/L) | $Nd_2O_3$ (g/L) | Other (g/L) | WC Amount (g/L) | SV | Reforming Rate (%) |
|---|---|---|---|---|---|---|---|---|---|---|
| Reference Example 1 | $Rh/Nd/Al_2O_3$ | $Al_2O_3$ | SiC | 7.9 | 0 | 6 | 0 | 150 | 60 | 44 |
| Example 1 | $Ni/CeO_2$ | $CeO_2$ | SiC | 0 | 7.9 | 0 | 0 | 150 | 60 | 28 |
| Example 2 | $Ni/Y—ZO_2$ | $Y—Zr_{O2}$ | SiC | 0 | 7.9 | 0 | 0 | 150 | 60 | 33 |
| Example 3 | $Rh/Nd/Al_2O_3$ + $NiCeO_2$ | $Al_2O_3(100)$ + $CeO_2(150)$ | SiC | 0.4 | 7.9 | 4 | 0 | 250 | 60 | 36 |
| Example 4 | $Rh/Nd/Al_2O_3$ + $NiCeO_2$ | $Al_2O_3(100)$ + $CeO_2(150)$ | SiC | 0.1 | 7.9 | 4 | 0 | 250 | 60 | 32 |
| Comparative Example 1 | $Cu/CeO_2$ | $CeO_2$ | SiC | 0 | 0 | 0 | CuO = 7.9 | 150 | 60 | 12 |
| Comparative Example 2 | $Pt/CeO_2$ | $CeO_2$ | SiC | 0 | 0 | 0 | Pt = 7.9 | 150 | 60 | 12 |
| Comparative Example 3 | $Ni/Al_2O_3$ | $Al_2O_3$ | SiC | 0 | 7.9 | 0 | O | 150 | 60 | 13 |
| Comparative Example 4 | $Cu/Al_2O_3$ | $Al_2O_3$ | SiC | 0 | 0 | 0 | CuO = 7.9 | 150 | 60 | 9 |
| Comparative Example 5 | $R/Al_2O_3$ | $Al_2O_3$ | SiC | 0 | 0 | 0 | Pt = 7.9 | 150 | 60 | 10 |
| Comparative Example 6 | $Cu/Y—ZrO_2$ | $Y—ZrO_2$ | SiC | 0 | 0 | 0 | CuO = 7.9 | 150 | 30 | 7 |
| Comparative Example 7 | $Fe/Y—ZrO_2$ | $Y—ZrO_2$ | SiC | 0 | 0 | 0 | $Fe_2O_3$ = 7.9 | 150 | 30 | 3 |
| Reference Example 2 | $Rh/Nd/Al_2O_3$ | $Al_2O(250)$ | Cordierite | 9.6 | 0 | 10 | 0 | 250 | 60 | 32 |
| Example 5 | $Rh/Ni/CeO_2$ | $CeO_2(250)$ | Cordierite | 0.24 | 12.5 | 0 | 0 | 250 | 60 | 30 |
| Example 6 | $Rh(0.2)Nd/Al_2O_3$ + $Rh(0.04)/Ni/CeO_2$ | $Al_2O_3(60)$ + $CeO_2(190)$ | Cordierite | 0.24 | 9.5 | 2.4 | 0 | 250 | 60 | 22 |

The invention claimed is:

1. A fuel-reforming catalyst for reforming exhaust gas and a fuel containing a hydrocarbon into a syngas containing hydrogen, comprising
   a catalyst component and a carrier supporting the catalyst component, wherein
   the catalyst component consists essentially of nickel, and
   the carrier contains a metal oxide comprising zirconium or cerium.

2. The fuel-reforming catalyst according to claim 1, wherein the metal oxide is cerium oxide.

3. A fuel-reforming method using the fuel-reforming catalyst according to claim 1, comprising
   generating hydrogen and carbon monoxide by bringing a fuel containing a hydrocarbon into contact with the fuel-reforming catalyst in the presence of water vapor contained in exhaust gas.

4. A fuel-reforming engine system comprising:
   reforming all or part of a fuel containing a hydrocarbon into hydrogen and carbon monoxide using post-combustion exhaust gas from an internal combustion engine and the fuel-reforming catalyst according to claim 1; and
   adding the obtained hydrogen and carbon monoxide to a fuel which is supplied to the internal combustion engine.

5. The fuel-reforming engine system according to claim 4, wherein the fuel-reforming catalyst is held on a substrate having a honeycomb shape.

6. The fuel-reforming catalyst according to claim 1, wherein the fuel-reforming catalyst is the mixture of the catalysts A and B,
   the catalyst A comprising a catalyst component and a carrier supporting the catalyst component, wherein the catalyst component consist of only nickel and the carrier contains zirconium and cerium, and
   the catalyst B comprising a catalyst component and a carrier supporting the catalyst component, wherein the catalyst component consist of rhodium and the carrier contains an alumina.

7. The fuel-reforming catalyst according to claim 6, wherein the catalyst B further comprises a promotor component comprising neodymium.

\* \* \* \* \*

UNITED STATES PATENT AND TRADEMARK OFFICE
CERTIFICATE OF CORRECTION

PATENT NO. : 12,319,578 B2
APPLICATION NO. : 18/685771
DATED : June 3, 2025
INVENTOR(S) : Kunihiro Kojima et al.

Page 1 of 1

It is certified that error appears in the above-identified patent and that said Letters Patent is hereby corrected as shown below:

On the Title Page

"(30) Foreign Application Priority Data" should read:
Aug. 24, 2021 (JP) ............................ 2021-136456

Signed and Sealed this
Eighth Day of July, 2025

Coke Morgan Stewart
*Acting Director of the United States Patent and Trademark Office*